May 3, 1932.  P. SUBKOW ET AL  1,856,892
APPARATUS FOR GAS LIFT CONTROL
Filed May 26, 1930

INVENTORS
Philip Subkow & Jacob J. Kogan
BY
Philip Subkow
ATTORNEY.

Patented May 3, 1932

1,856,892

UNITED STATES PATENT OFFICE

PHILIP SUBKOW AND JACOB J. KOGAN, OF LOS ANGELES, CALIFORNIA, ASSIGNORS TO UNION OIL COMPANY OF CALIFORNIA, OF LOS ANGELES, CALIFORNIA, A CORPORATION OF CALIFORNIA

APPARATUS FOR GAS LIFT CONTROL

Application filed May 26, 1930. Serial No. 455,914.

This invention relates to the so-called "gas-lift" method of flowing deep wells, particularly oil wells, and has been designed to automatically maintain a constant gas-oil ratio, that is a constant relation between the volume of gas used and the volume of oil discharged thereby.

Gas-lift, as now practiced, consists in passing gas under pressure into a well containing a flow tube, so that the gas passes in a stream into the flow tube adjacent its lower end, and in its passage atomizes the oil entering into said flow tube, the atomized oil being carried to the surface in said gas stream. The gas may be introduced either through the flow tube or through the casing, the atomized oil being discharged from the other of the two. The function of the gas is to elevate the oil in the flow tube and the amount of introduced gas necessary for the elevation of the oil, is proportional to the weight of the column of fluid in the flow tube.

Thus, the static or head pressure produced in the tubing of a well flowing by gas-lift varies in response to the varying proportions of gas and of oil held in said tubing. This variation in the static head may be produced by a sudden increase or decrease in the rate of flow of oil and gas from the formation into the casing, and from the casing into the flow tube. This change in rate will cause an increase or decrease in the static head in the flow tube depending on the variation of the gravity (i. e. oil-to-gas ratio in the flow tube). The static pressure, assuming a constant rate of flow of oil, may also vary due to a change in the rate of gas introduction into the flow tube, since the specific weight of the mixture will thus change. The variation in static head may be produced as well by the combination of the above causes, or by other causes, such as an entrance of a slug of water, sand, or the like into the flow tube.

Since an increase in the static pressure in the flow tube means that there is more oil per unit volume of gas in said flow tube, a greater volume of gas is required to elevate this oil and to prevent the cessation of flow of fluid from said well to the surface. Inversely, a decrease in the static head means less oil in the flow tube at that instant, requiring less gas to lift it, and, if gas introduction is not reduced, a waste of gas energy results from the unnecessary blowing of the gas through the flow tube.

The maintenance of a constant ratio between the volumes of gas and oil flowing from an eduction pipe of a well is of great importance in that it insures most efficient oil recovery as well as an economic saving in gas energy.

The control of gas may be made either at the surface or, as we prefer to operate, at or near the point of introduction of gas into the fluid eduction pipe.

It has been found that a control or regulation of the inflow of gas into a well casing at the surface in proportion to the inflow of fluid into a flow tube in the well is not accurate, mainly due to a lag or buffer effect induced by the large gas volume of said casing. An increased flow of oil into the flow tube, as stated above, means that a greater volume of gas is necessary to elevate said oil. However, in case the control regulates the amount of gas introduced into the well casing, i. e. at the surface, the increased inflow of gas thereinto must first fill said casing and raise the pressure therein before this increased gas pressure is able to counteract the static head in the flow tube and enter thereinto. Inversely, a drop in the rate of inflow of fluid into the flow tube, resulting in a drop of gas necessary for its elevation, does not immediately regulate the inflow of gas into said flow tube to maintain a constant gas-oil ratio, but lags by a period of time necessary to transmit the excess gas pressure or energy through the well casing to the point of inflow to the tube.

By providing the regulating means near the point of introduction of the gas into the fluid eduction tube, the above mentioned objectionable lag is overcome and at the same time a compact and simple operating means may be provided.

The present invention has for its general object, the regulation of the introduction of gas under pressure into the flow tube in proportion to the rate of flow of oil into the tube, thus maintaining a constant and desired gas-oil ratio in said flow tube.

Another object of the invention is to regulate the flow of gas under pressure into the flow tube in proportion to variations in the static pressure in said flow tube.

More specifically stated, another object of the invention is to regulate automatically the amount of gas entering the flow tube from the casing or gas induction pipe in proportion to the static head in the flow tube at each moment, thus obtaining a constant ratio between the gas and oil in said flow tube.

These and other objects are attained by providing at or near the bottom of the eduction tube a regulating means constantly responsive to the static head of the mixture of oil and gas rising in the tube, such means being operative to regulate automatically the introduction of gas under pressure into said eduction tube in proportion to the variations in the static pressure therein. Thus, constant and prompt regulation of the volume of gas under pressure introduced into the flow tube in relation to the amount of oil flowing through it will be obtained, and a constant gas-oil ratio in this flow or eduction pipe will be maintained.

Because of a loss of energy caused by a passage of gas through a throttling valve, and due to wear of the valve by the stream of gas forced under pressure therethrough, it is sometimes advantageous to maintain a constant gas-oil ratio in a flow tube of a well flowing by the gas-lift method by frequently and alternately completely opening and closing the valve which introduces gas under pressure into said flow tube by means of a snap-acting device on the valve.

Briefly stated, the invention may therefore be said to reside in a method, and in a device with which to carry on such a method, for maintaining a constant gas-oil ratio in a flow tube of a well operating by gas-lift which comprises employing the static head of the mixture in the flow tube to regulate the introduction of gas directly into the lower portion of said flow tube in relation and in proportion to said static head. The invention further comprises means associated with a flow tube and responsive to the static head therein, in combination with means controlled thereby to regulate the inflow of gas at the point of inflow into said flow tube, in response to the variations in static head therein. More particularly stated, the invention comprises a piezometer ring installed adjacent the lower end of the flow tube, said piezometer ring transmitting the variations in static head in the flow tube, a valve opening from the well casing into the flow tube, and means operatively connected to the piezometer ring to operate the valve in response to the changes in the static head, for maintaining a constant gas-oil ratio in said flow tube. The invention further comprises a snap-acting device operating a rotary valve on the lower portion of the flow tube so that the valve will be quickly and completely opened and closed by small variations in the static head in said flow tube thus maintaining a constant gas-oil ratio therein.

The term "piezometer" as used throughout this case is to be understood to mean a device which automatically and constantly measures and transmits the static head of fluid above it in the fluid eduction pipe or tubing. In the preferred form of construction, the piezometer ring is a narrow air-tight annular tube encircling the educting tube and opening thereinto by means of a plurality of small pipes. By the term "sylphon bellows" we means a resilient metallic bellows expansible and contractible in response to pressure changes exerted therein. It is used herein to transmit changes in fluid head. It will be apparent to those skilled in the art that any other pressure transmitting agency, such as a diaphragm or movable piston, may be used in its stead.

This invention will be better understood by reference to the accompanying drawings, wherein Fig. 1 indicates a gas-oil ratio controlling device positioned in a well substantially on the lower end of a gas induction pipe for constantly controlling gas flow;

Fig. 2 indicates a modified type of a device mounted on the lower portion of a flow tube, said device being adapted to produce a controlled flow of oil from the well by intermittent introduction of gas;

Figure 1:
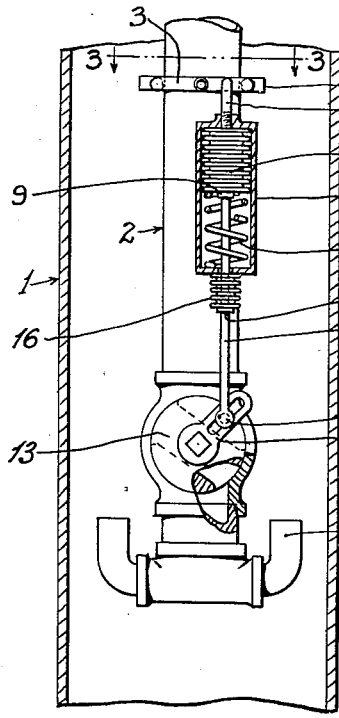
Figure 3:
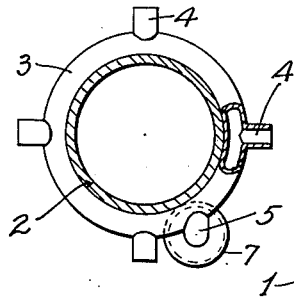
Fig. 3 is a section along line 3—3 of Fig. 1.
Figure 4:
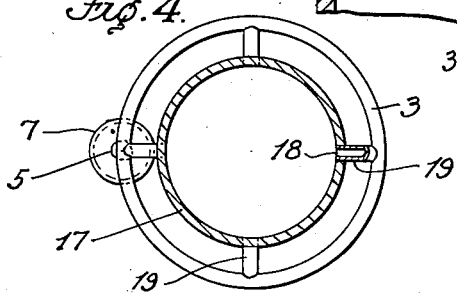
Fig. 4 is a section along line 4—4 of Fig. 2.

As shown in Figs. 1 and 3, the gas-oil ratio controlling device is positioned in a well casing 1, said device being attached to the lower end of a gas induction pipe 2. A piezometer ring 3, having nipples 4 opening into the annular oil space between the gas induction pipe 2 and the well casing or flow pipe 1, is carried on the outside of said gas induction pipe 2, and is connected by a pipe 5 to a sylphon bellows 6 placed in a pressure-tight chamber 7 also rigidly attached to the side of the induction pipe 2. A rod 8 is connected at the top to a plate 9 held against the lower surface of the bellows 6 by the action of a spring 10, and the lower end of said rod 8 is hinge-connected at 11 to a lever 12 of a rotary valve 13 installed in the gas induction pipe 2. The bottom of the gas induction pipe 2 has any type of opening 14 for the introduction and distribution of high pressure gas from the gas induction pipe 2 into the above mentioned annular oil space which is supplied with oil from the formation.

To prevent the accumulation of pressure in the chamber 7 around the bellows 6, which pressure would hinder the action of the bellows, the rod 8 is welded at 15 to a small sylphon bellows 16 mounted on chamber 7 and adapted to expand and contract as the rod 8 is moved by the bellows 6.

The device functions as follows:

Assuming that at the beginning of the gas-lift operation a relatively high column of oil exists in the annular space between the gas induction pipe 2 and the well casing or flow pipe 1, the head creates a relatively high static pressure in the piezometer ring 3. This static pressure is conveyed through the nipple 5 and expands the sylphon bellows 6. This expansion, opposed by the tension in the spring 10, pushes the rod 8 downwardly and actuates the lever 12 to open the rotary valve 13, thus introducing high pressure gas from the gas induction pipe 2 through the nozzles 14 and into the oil in the annular space. As soon as the introduced gas begins to lighten the column of oil and gas in said annular space by discharge of a portion of the oil from the top of the casing 1, the static pressure in the piezometer ring starts dropping and the sylphon bellows 6 partially collapses, thus raising the rod 8, rotating valve 13 and throttling down the amount of high pressure gas introduced into the flow tube 1 from the gas induction pipe 2. It is thus clear that, by providing a spring 10 of a proper tension, it will be possible to regulate and maintain a proper volumetric relation between oil and gas in the flow pipe, since the opening or closing of the valve 13 will be determined by the position of the plate 9 which in turn depends on the static head in flow pipe 1 and on the tension of the spring 8.

From the foregoing, it will be obvious that the above device tends to maintain a constant gas-oil ratio in the flow tube, and that the changes in said gas-oil ratio in the flow tube are immediately caused to vary proportionally the amount or rate of introduction of gas under pressure into said flow tube, thus tending to maintain said gas-oil ratio constant. The device is responsive to small changes in the gas-oil ratio as transmittel by the piezometer, and the functioning of the device is automatic.

Figure 2:
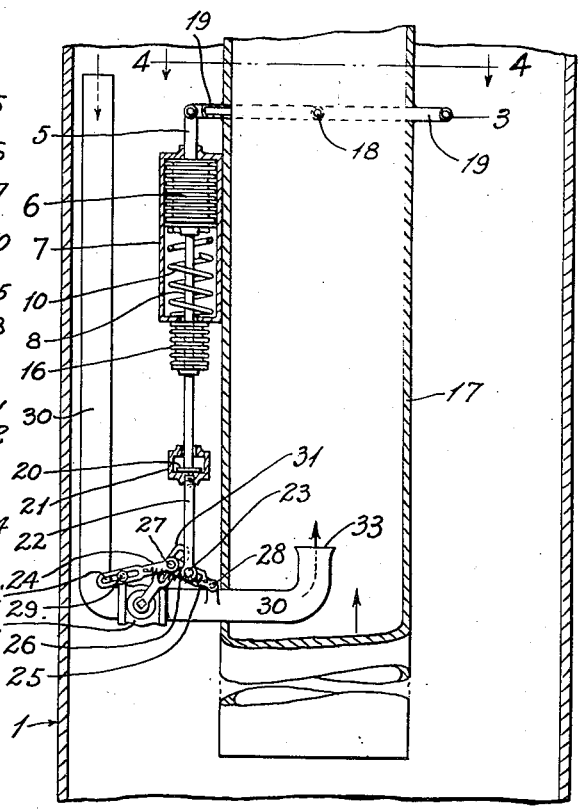
Figure 5:
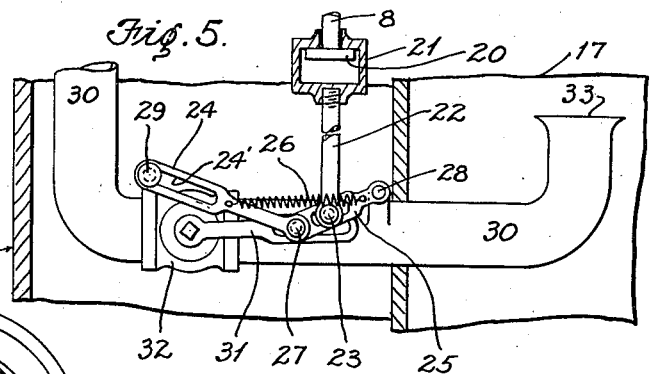
Fig. 5 is a view on an enlarged scale of the snap-acting mechanism of Fig. 2 which intermittently actuates the gas valve.

For the purpose of obtaining a constant gas-oil ratio it is sometimes advantageous to permit a frequent and alternate opening and closing of the valve which introduces gas into the flow tube. Such a device is shown in Figs. 2 and 5 which also illustrate flow through the center or flow tube 17 to which the device is attached near its bottom. In this case the piezometer ring 3 is connected at a plurality of points 18 by means of nipples 19 with the interior of the tube 17. As in the other form, the piezometer is connected by pipe 5 with sylphon bellows 6 positioned in closed chamber 7 attached to the outer wall of the flow tube, the bellows operating against the action of the spring 10 to actuate the rod 8, which passes out of the chamber 7 through welded joint 15 in small bellows 16. In the present form however the rod 8 terminates in a head or boss 20 which is encased in a lost-motion device 21 attached to another rod 22 whose opposite end is pivoted at 23 to a valve-actuating apparatus having a snap action. This apparatus consists of two links 24 and 25 and a spring 26, said links being connected by pivot pin 27. The opposite end of link 25 is hingedly mounted at 28 on gas injection pipe 30, and the opposite end of link 24 is slotted at 24 for a hinged and sliding mounting on point 29. The spring 26 is attached to the links 24 and 25 intermediate their ends to produce the snap action which is imparted through pivot pin 27 to a lever 31 which actuates a rotary valve 32 installed in the pipe 30 for regulating the introduction of gas into the flow tube 21, through any type of nozzle 33.

The action of this form of the device is as follows: When the static pressure in the tubing 17 increases slightly, the piezometer ring 3 transmits the static head in the form of pressure to the sylphon bellows 6, which latter moves rod 8 downwardly, and the head 20 on said rod 8, abutting against the bottom of the lost-motion device 21, also produces a downward movement in the rod 22 and in the links 24 and 25 of the device producing a snap action. As soon as rod 22 has forced the links 24 and 25 past their dead-center, the action of the spring 26 moves them to their other extreme position shown in Fig. 5. This movement pulls rod 22 downwardly, but the rod 8 remains stationary due to the action of the lost-motion device 21, preventing injury of the sylphon bellows 6 by a forced expansion thereof. This also insures the direct response of bellows 6 to variations in the static pressure. The downward movement of the snap-action links 24 and 25 causes a movement of lever 31, said movement completely opening valve 32 and introducing gas under pressure into the fluid located in the tubing 17.

As soon as gas is introduced into the tubing 17, the static head therein starts to drop, and this effects the contracting of the sylphon bellows 6. Rods 8 and 22 then move upwardly and, as soon as the links 24 and 25 are just past their dead-center, the spring 26 again snaps them into the position shown in Fig. 2, in which position valve 32 is closed by lever 31 and the inflow of gas into the flow tube 17 is stopped.

With this construction a very small motion of the sylphon bellows 6, representing a small variation of the static head in the flow tube 17, may be caused to completely open and completely close the valve 32, thus alternately permitting and preventing the flow of high pressure gas into the flow tube. A constant gas-oil ratio of the fluid flowing from the well will thus be obtained.

The above disclosures are to be considered not as limiting but as merely illustrative, and many variations which will be apparent to those skilled in the art may be made within the scope of the following claims.

1. A gas lift method for oil wells comprising applying gas under pressure to an eduction tube for discharging oil from said tube, and continuously regulating the flow of gas into the tube in response to variations in static head in the well to maintain a substantially continuous introduction of gas during the oil discharge, said regulation being applied adjacent the point of introduction of the gas into the tube.

2. In a method of maintaining a constant gas-oil ratio in a fluid eduction pipe through which oil is elevated by gas lift, the step of automatically varying the supply of gas to the pipe to increase the gas supply as static head in the pipe increases and to decrease said gas supply as the static head decreases, said regulation being applied adjacent the point of introduction of the gas into the pipe.

3. A gas lift method comprising applying gas under pressure to an eduction tube to lift liquid through said tube and continuously regulating the flow of gas adjacent its point of introduction to the eduction tube and in response to variations in static pressure in said tube to maintain a substantially continuous introduction of gas during the oil discharge.

4. A gas lift method comprising applying gas under pressure to an eduction tube to lift liquid through said tube, and maintaining a substantially constant gas-oil ratio in the discharged fluid by regulation adjacent the point of introduction of the gas to said tube in proportion to variations in static head.

5. A gas-lift device comprising in combination, a fluid eduction pipe connected at one end to a fluid supply, means associated with said pipe and responsive to static pressure therein, means to supply gas to said pipe, a valve in the gas supply adjacent the point of introduction of gas into said eduction tube, and means operatively connected with the first mentioned means to maintain a substantially continuous inflow of gas into said pipe only in response to the static pressure in the pipe.

6. In a gas-lift device, a gas induction pipe and a fluid eduction pipe communicating with each other, means associated with said fluid eduction pipe and responsive to fluctuations in static pressure of fluid in the eduction pipe, a conduit to supply gas to said eduction pipe from said induction pipe, and means at the point of gas introduction into said eduction pipe operatively connected with the first mentioned means to regulate the rate of introduction of gas from the gas induction pipe in proportion to fluctuations of static pressure in said eduction pipe and independently of variations of applied gas pressure.

7. In a gas-lift device, a gas induction pipe and a fluid eduction pipe communicating with each other, a piezometer responsive to fluctuations in the static pressure in the lower portion of said eduction pipe, a valve to control flow of gas from the induction pipe to the eduction pipe, the valve being located near the point of gas introduction into said eduction pipe, and means operatively connected with said piezometer to regulate said valve to vary the introduction of gas into said eduction pipe in proportion to said fluctuations.

8. In combination with a gas induction pipe and a fluid eduction pipe communicating with each other, a piezometer adjacent the lower end of said eduction pipe responsive to the fluctuations in static pressure therewithin, a conduit opening from the gas induction pipe into the fluid eduction pipe, a valve on said conduit, and a mechanical connection between the piezometer and the valve to regulate the introduction of gas through said valve and into said eduction pipe in proportion to fluctuations in static pressure transmitted by the piezometer.

9. A device for maintaining a constant gas-oil ratio comprising a fluid eduction pipe, means to supply gas under pressure to said pipe, a piezometer ring opening into said eduction pipe, means actuable by said piezometer, and a valve at the point of gas introduction into said eduction pipe operatively connected with and controlled by said actuable means to vary the rate of gas introduction into said pipe in proportion to variations of static pressure.

10. In a device for maintaining a constant gas-oil ratio in a fluid eduction pipe, means to introduce gas into said pipe, a piezometer ring opening into said eduction pipe, a movable member actuable by said piezometer, and a valve at the point of gas introduction mechanically connected with said member to close and open the passage of gas into the fluid eduction pipe in accordance with the variations in pressure as transmitted by the piezometer ring.

11. A device for maintaining a constant gas-oil ratio in a fluid eduction pipe comprising a piezometer ring opening into said eduction pipe, a movable member responsive to static pressure in said piezometer ring, a rod connected to said movable member, a closed chamber encasing said movable member, and a valve associated with said pipe and operatively connected to said rod to open and close the passage of gas directly into the fluid eduction pipe in accordance with the variations in pressure as transmitted by the piezometer ring.

12. A construction according to claim 11, wherein the rod connected to the movable member projects through said chamber, and a small bellows attached to said chamber and said rod to form a sealed joint.

13. In combination with a gas induction pipe and a fluid eduction pipe communicating with each other, the lower portion of the fluid eduction pipe being open to provide for continuous entrance of oil, a piezometer ring opening into the lower portion of the fluid eduction pipe and responsive to changes in static pressure within the same, a conduit opening from the gas induction pipe into the fluid eduction pipe, a valve for said conduit and means operatively connecting the piezometer ring and the valve to open and close said valve in accordance with changes in the static pressure.

14. In combination with a gas induction pipe and a fluid eduction pipe communicating with each other, the lower portion of the fluid eduction pipe being open to provide for continuous entrance of oil, a piezometer ring opening into the fluid eduction pipe, a bellows responsive to static pressure in said piezometer ring, a conduit opening from the gas induction pipe into the fluid eduction pipe, a valve on said conduit, and means operatively connecting the bellows and the valve to open and close said valve in accordance with the changes in the static pressure.

Signed at Los Angeles, in the county of Los Angeles and State of California, this 15 day of May, A. D. 1930.

PHILIP SUBKOW.
JACOB J. KOGAN.